(12) United States Patent
Su et al.

(10) Patent No.: US 9,104,035 B2
(45) Date of Patent: Aug. 11, 2015

(54) DISPLAY DEVICE AND DRIVING METHOD OF DISPLAY DEVICE

(71) Applicants: Yan-Yu Su, Changhua County (TW); Chong-Yang Fang, Taichung (TW); Chun-Ho Chen, Changhua County (TW); Wen-Chun Wang, Taichung (TW); Tsung-Hsien Lin, Taichung (TW)

(72) Inventors: Yan-Yu Su, Changhua County (TW); Chong-Yang Fang, Taichung (TW); Chun-Ho Chen, Changhua County (TW); Wen-Chun Wang, Taichung (TW); Tsung-Hsien Lin, Taichung (TW)

(73) Assignee: WINTEK CORPORATION, Taichung (TW)

( * ) Notice: Subject to any disclaimer, the term of this patent is extended or adjusted under 35 U.S.C. 154(b) by 112 days.

(21) Appl. No.: 14/069,385

(22) Filed: Nov. 1, 2013

(65) Prior Publication Data

US 2014/0125878 A1    May 8, 2014

(30) Foreign Application Priority Data

Nov. 2, 2012    (TW) .............................. 101140752 A

(51) Int. Cl.
*G02B 27/26* (2006.01)
*H04N 13/04* (2006.01)
*G02B 27/22* (2006.01)

(52) U.S. Cl.
CPC ............ *G02B 27/26* (2013.01); *G02B 27/2264* (2013.01); *H04N 13/0438* (2013.01); *H04N 13/0459* (2013.01)

(58) Field of Classification Search
None
See application file for complete search history.

(56) References Cited

U.S. PATENT DOCUMENTS

2014/0028815 A1*  1/2014  Atkins ............................ 348/58

FOREIGN PATENT DOCUMENTS

TW            M374573         2/2010

* cited by examiner

*Primary Examiner* — Richard Kim
(74) *Attorney, Agent, or Firm* — Jianq Chyun IP Office

(57) ABSTRACT

A display device for a user to observe a stereo image through a pair of polarization glasses includes a projector, a switchable polarizer, and a sensor. The projector sequentially displays a first image, a first middle image, a second image, and a second middle image on a projection screen. The switchable polarizer is located between the projector and the projection screen and is switchable between a first mode and a second mode, so that each of the first and second images has a first or second polarization after passing through the switchable polarizer in the first or second mode and is then projected onto the projection screen. The sensor is coupled to the switchable polarizer and senses the images on the projection screen. When the sensor senses the first middle image or the second middle image, the switchable polarizer switches between the first mode and the second mode.

17 Claims, 4 Drawing Sheets

DISPLAY DEVICE AND DRIVING METHOD OF DISPLAY DEVICE

CROSS-REFERENCE TO RELATED APPLICATION

This application claims the priority benefit of Taiwan application serial no. 101140752, filed on Nov. 2, 2012. The entirety of the above-mentioned patent application is hereby incorporated by reference herein and made a part of this specification.

BACKGROUND OF THE INVENTION

1. Field of the Invention

The invention relates to a display device, and more particularly, to a display device that may perform a stereo display function.

2. Description of Related Art

The commonly known stereo projection technologies may be categorized into active-type and passive-type technologies. According to the active-type stereo projection technology, stereo images may be observed by a user who wears shutter glasses and may be displayed by applying a digital light processing (DLP) technique. Shutters of the shutter stereo glasses for the right eye and the left eye may be individually controlled. When left-eye and right-eye images are alternately displayed by one DLP projector, a stereo image may be displayed by synchronously switching between the two shutters.

In particular, when the left-eye image is displayed by the DLP projector, the left-eye shutter is opened, and the right-eye shutter is closed, such that the left-eye image is rendered to the left eye but not to the right eye. On the contrary, when the right-eye image is displayed by the DLP projector, the right-eye shutter is opened, and the left-eye shutter is closed, such that the right-eye image is rendered to the right eye but not to the left eye. Since the left-eye and right-eye images are respectively observed by the left eye and the right eye, the resultant parallax allows a person who wears the shutter glasses to observe the stereo (three-dimensional) image.

Nonetheless, the heavy weight of the shutter glasses often discomforts a user who wears the shutter glasses for a long period of time.

SUMMARY OF THE INVENTION

An embodiment of the invention provides a display device that may alleviate the discomfort of a user when the user observes a stereo image.

Another embodiment of the invention provides a driving method of a display device for displaying a stereo image.

In an embodiment of the invention, a display device is provided, and a user sees an image displayed by the display device through a pair of polarization glasses, so as to obtain a stereo image. The display device includes a projector, a switchable polarizer, and a sensor. The projector sequentially displays a first image, a first middle image, a second image, and a second middle image on a projection screen. The switchable polarizer is located between the projector and the projection screen. Besides, the switchable polarizer is switchable between a first mode and a second mode, such that each of a light of the first image and another light of the second image has a first polarization state or a second polarization state after passing through the switchable polarizer in the first mode or the second mode and is then projected onto the projection screen. The sensor is coupled to the switchable polarizer and senses the images on the projection screen. When the sensor senses the first middle image or the second middle image, the switchable polarizer switches from one of the first mode and the second mode to the other.

According to an embodiment of the invention, the switchable polarizer includes a liquid crystal unit and a polarization plate that is located between the projector and the liquid crystal unit. The switchable polarizer may further include a quarter wave plate that is located between the polarization plate and the projection screen. The quarter wave plate can be located between the liquid crystal unit and the projection screen or between the liquid crystal unit and the polarization plate. The display device may further include a control unit that is coupled to the sensor and the switchable polarizer. When the sensor senses the first middle image or the second middle image, the control unit drives the liquid crystal unit, such that the switchable polarizer switches from one of the first mode and the second mode to the other.

According to an embodiment of the invention, the projection screen is a screen capable of reflecting light without a depolarization.

According to an embodiment of the invention, a first lens and a second lens of the pair of polarization glasses respectively have transmission axes allowing the light having the first polarization state and the second polarization state to pass through.

According to an embodiment of the invention, the projector is a digital light processing (DLP) projector.

According to an embodiment of the invention, the first middle image and the second middle image are identical.

According to an embodiment of the invention, the first middle image is different from the second middle image; the switchable polarizer switches from the first mode to the second mode when the sensor senses the first middle image, and the switchable polarizer switches from the second mode to the first mode when the sensor senses the second middle image.

In an embodiment of the invention, a driving method of a display device is further provided. In the driving method, the display device is provided. The display device includes a projector screen, a projector, a switchable polarizer, and a sensor. The projector sequentially displays a first image, a first middle image, a second image, and a second middle image on the projection screen. The switchable polarizer is located between the projector and the projection screen. Besides, the switchable polarizer is switchable between a first mode and a second mode. The sensor is coupled to the switchable polarizer and senses the images on the projection screen. When the sensor senses the first middle image or the second middle image, the switchable polarizer is switched from one of the first mode and the second mode to the other, such that each of a light of the first image and another light of the second image has a first polarization state or a second polarization state after passing through the switchable polarizer in the first mode or the second mode and is projected onto the projection screen.

According to an embodiment of the invention, the display device further includes a control circuit that is coupled to the sensor and the switchable polarizer. When the control circuit receives a signal indicating that the sensor senses the first middle image or the second middle image, the control circuit outputs a synchronous signal to the switchable polarizer. According to an embodiment of the invention, the synchronous signal includes a first voltage and a second voltage, and the first voltage and the second voltage drive the switchable polarizer to be in the first mode and the second mode, respectively. According to an embodiment of the invention, when the control circuit receives a signal indicating that the sensor senses the first middle image, the synchronous signal is the first voltage; when the control circuit receives another signal indicating that the sensor senses the second middle image, the synchronous signal is the second voltage. A start time of the synchronous signal is synchronized with a start time of the first middle image or a start time of the second middle image.

To sum up, in the display device described above, images are provided by the projector, and the switchable polarizer is placed in front of the projector. Thereby, a user may observe the stereo image as long as the user wears a pair of polarization glasses having simple and light structure, so as to ease the discomfort resulting from the shutter glasses.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
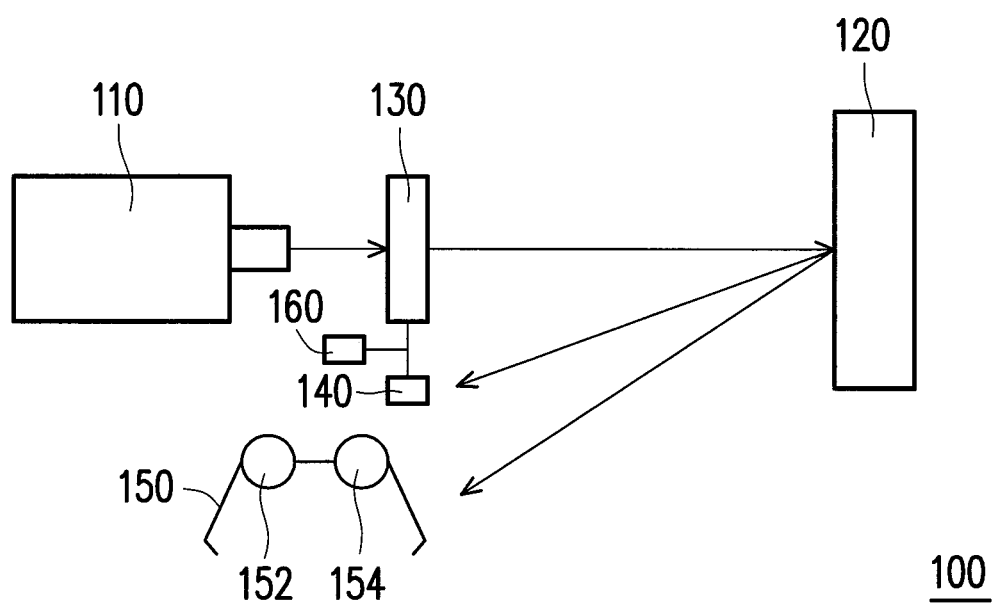
FIG. 1 is a schematic view illustrating a display device according to an embodiment of the invention.

FIG. 1 is a schematic view illustrating a display device according to an embodiment of the invention. With reference to FIG. 1, the display device 100 includes a projector 110, a projector screen 120, a switchable polarizer 130, and a sensor 140. The projector 110 projects images on the projection screen, and the switchable polarizer 130 is located between the projection screen 120 and the projector 110. The sensor 140 is coupled to the switchable polarizer 130.

The projector 110 serves to provide images and may be a digital light processing (DLP) projection system. Hence, the projector 110 may receive digital videos and thereby generate a series of digital light pulses. After the light pulses enter human eyes, the eyes interpret the light pulses as color analog images. The projector screen 120 serves to reflect the light of the image (displayed by the projector 110) to the user.

Since the switchable polarizer 130 is able to adjust the polarization state of light, the light passing the switchable polarizer 130 may have the specific polarization state. The switchable polarizer 130 is located between the projector 110 and the projection screen 120. Hence, before the image displayed by the projector 110 is projected onto the projection screen 120, the light of the image passes through the switchable polarizer 130, and thus the light of the image may have certain polarization state. In the present embodiment, the projection screen 120 is a screen capable of reflecting the light without a depolarization, so as to prevent the polarization state of the light of the image from being changed after the light incident to the projection screen 120. For instance, a metal reflection layer may be coated onto the projection screen 120, or silver paste may be attached to the surface of the projection screen 120.

In the present embodiment, the switchable polarizer 130 is switchable between a first mode and a second mode. When the switchable polarizer 130 is in the first mode, the light projected onto the projection screen 120 has the first polarization state; when the switchable polarizer 130 is in the second mode, the light projected onto the projection screen 120 has the second polarization state. Light, when passing the switchable polarizer 130 in different modes, may have different polarization states. Therefore, a first lens 152 and a second lens 154 of a pair of polarization glasses 150 on a user may respectively have different transparent axes, and the left eye and the right eye of the user may respectively receive the light with different polarization states, such that the user is allowed to observe a stereo image.

Figure 2:
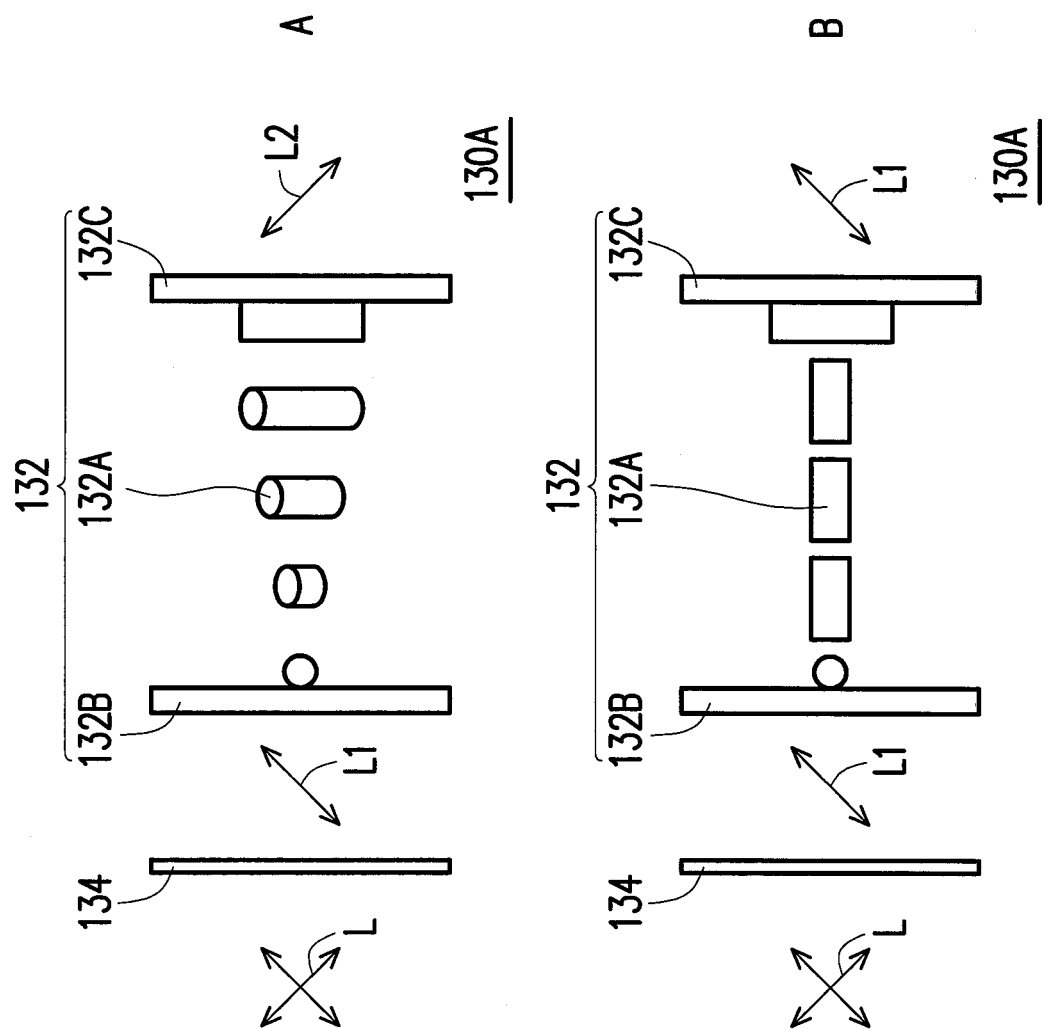
FIG. 2 is a schematic view illustrating a switchable polarizer according to an embodiment of the invention.

The switchable polarizer 130 described above is capable of switching between different modes through a liquid crystal layer. FIG. 2 is a schematic view illustrating a switchable polarizer according to an embodiment of the invention. With reference to FIG. 2, the switchable polarizer 130A is an example of the switchable polarizer 130 and includes a liquid crystal unit 132 and a polarization plate 134, and the liquid crystal unit 132 includes a liquid crystal layer 132A, a first substrate 132B, and a second substrate 132C. The first and second substrates 132B and 132C together seal the liquid crystal layer 132A therebetween. The polarization plate 134 is placed on one side of the liquid crystal unit 132. As shown in FIG. 1 and FIG. 2, when the switchable polarizer 130 having the design as the switchable polarizer 130A is located between the projector 110 and the projection screen 120, the polarization plate 134 is located between the projector 110 and the liquid crystal unit 132. In addition, as indicated in FIG. 2, the switchable polarizer 130A is switchable between a first mode A and a second mode B.

The light L of the images displayed by the projector 110 does not have specific polarization state in most cases. After the light L passes through the polarization plate 134, the light L may be transformed into light L1 having the first polarization state. When the switchable polarizer 130A is in the first mode A, the liquid crystal layer 132A of the liquid crystal unit 132 may provide the optical function to rotate the polarization direction of the light L1. Therefore, according to the present embodiment, when the switchable polarizer 130A is in the first mode A, the light L2 emitted from the liquid crystal unit 132 has the second polarization state which is different from the first polarization state. Additionally, when the switchable polarizer 130A is in the second mode B, the optical effects in the liquid crystal layer 132A ensure that the polarization direction of the light L1 is not changed. Therefore, according to the present embodiment, when the switchable polarizer 130A is in the second mode B, the light L1 emitted from the liquid crystal unit 132 has the first polarization state.

Figure 3:
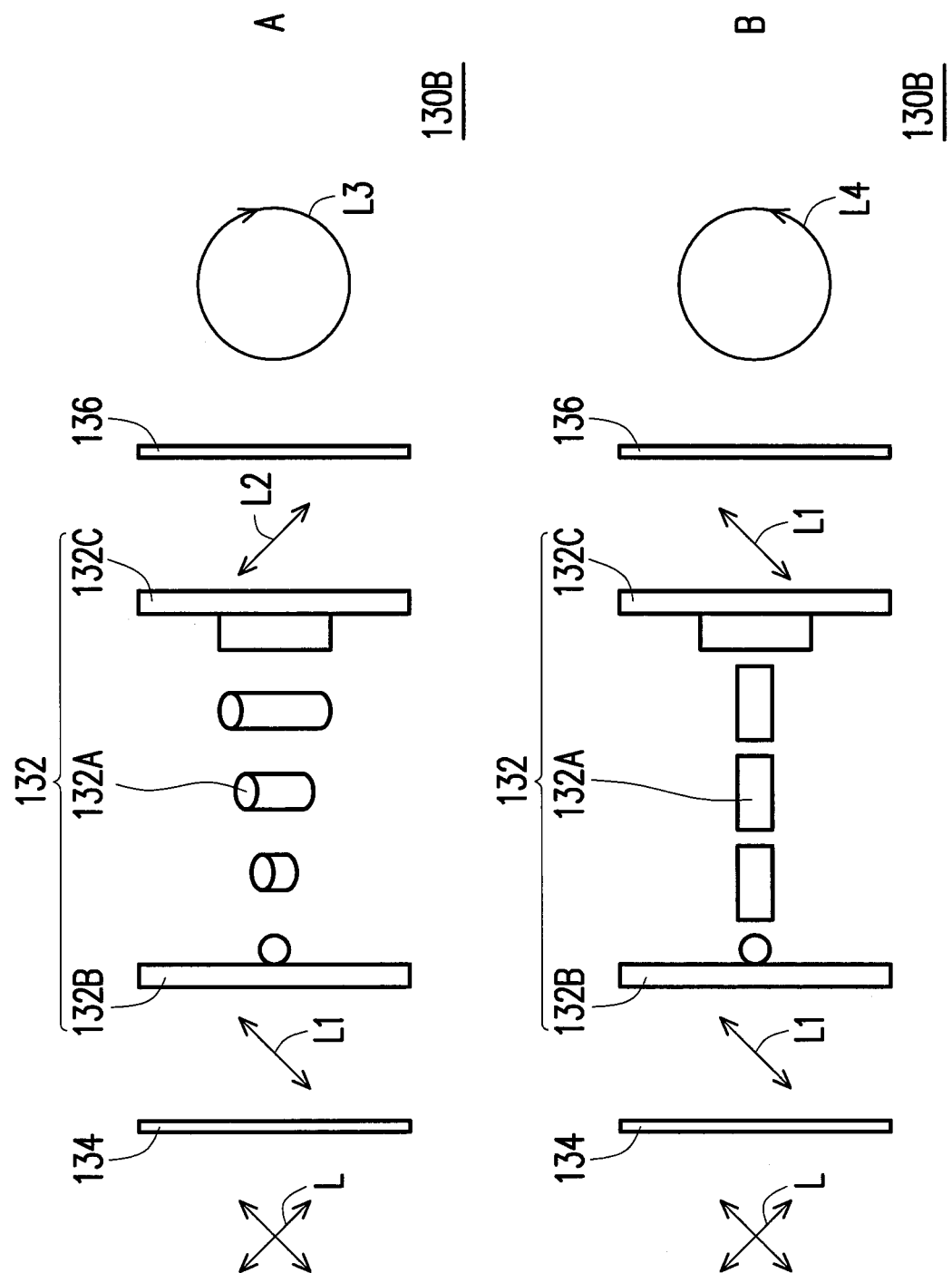
FIG. 3 is a schematic view illustrating a switchable polarizer according to an embodiment of the invention.

Said polarization states refer to linear polarization states, while the invention is not limited thereto. FIG. 3 is a schematic view illustrating a switchable polarizer according to an embodiment of the invention. With reference to FIG. 3, the switchable polarizer 130B is an example of the switchable polarizer 130 and includes a liquid crystal unit 132, a polarization plate 134, and a quarter wave plate 136. The liquid crystal unit 132 includes a liquid crystal layer 132A, a first substrate 132B, and a second substrate 132C. The first and second substrates 132B and 132C together seal the liquid crystal layer 132A therebetween. The polarization plate 134 and the quarter wave plate 136 are placed on two opposite sides of the liquid crystal unit 132. As shown in FIG. 1 and FIG. 3, when the switchable polarizer 130 having the design of the switchable polarizer 130B is located between the projector 110 and the projection screen 120, the polarization plate 134 is located between the projector 110 and the liquid crystal unit 132, and the quarter wave plate 136 is located between the liquid crystal unit 132 and the projection screen 120. However, in another embodiment, the quarter wave plate 136 may be selectively located between the liquid crystal unit 132 and the polarization plate 134. That is, the quarter wave plate 136 may be placed anywhere between the polarization plate 134 and the projection screen 120.

In addition, as indicated in FIG. 3, the switchable polarizer 130B is switchable between a first mode A and a second mode B. After the light L of the image displayed by the projector 110 passes through the polarization plate 134, the light L may be transformed into light L1 having the first polarization state. When the switchable polarizer 130B is in the first mode A, the liquid crystal layer 132A of the liquid crystal unit 132 may provide the optical function to rotate the polarization direction of the light L1. Therefore, the light L1 is transformed into the light L2 which has the second polarization state different from the first polarization state. After the linearly polarized light L2 passes through the quarter wave plate 136, the light L2 is transformed into light L3 having a first circular polarization state. Additionally, when the switchable polarizer 130B is in the second mode B, the optical effects in the liquid crystal layer 132A ensure that the polarization direction of the light L1 is not changed. Therefore, according to the present embodiment, when the switchable polarizer 130B is in the second mode B, the light L1 can have the second circular polarization state after passing the quarter wave plate 136, in which the second circular polarization state is different to the first circular polarization state.

Due to the switchable polarizer 130, capable of having the design as shown in FIG. 2 or FIG. 3, alternately switching between the first mode A and the second mode B, the light of the image displayed by the projector 110 may have different polarization states after passing the switchable polarizer 130, and the light in each polarization state is merely allowed to pass one of the first lens 152 and the second lens 154 of the pair of the polarization glasses 150. As such, the display device 100 is capable of rendering different images to different eyes, so as to accomplish the stereo display effects.

Particularly, with reference to FIG. 1, when displaying the stereo image, the projector 110 may display a first image and a second image for different eyes. In order to make sure that the first image and the second image are observed by different eyes, the polarization state of the light of the first image need be different from that of the light of the second image. Accordingly, in the present embodiment, when the projector 110 displays the first image, the switchable polarizer 130 is in one of the first mode and the second mode; when the projector 110 displays the second image, the switchable 130 is in the other one of the first mode and the second mode.

The projector 110 not only displays the first and second images but also displays the middle images therebetween, i.e., the first image, the first middle image, the second image, and the second middle image are sequentially displayed. After the first image and the second image are displayed, the first middle image and the second middle image are respectively displayed on the projection screen 120. Hence, the first and second middle images may serve as a basis on which the switchable polarizer 130 switches between different modes. In an embodiment of the invention, the first middle image may be identical to the second middle image, while the first and second middle images may be different from each other in another embodiment of the invention.

According to the present embodiment, the display device 100 may further include a control circuit 160 that is coupled between the sensor 140 and the switchable polarizer 130. When the sensor 140 senses the first middle image or the second middle image displayed on the projection screen, the control circuit 160 controls the switchable polarizer 130 to switch between different modes.

Figure 4:
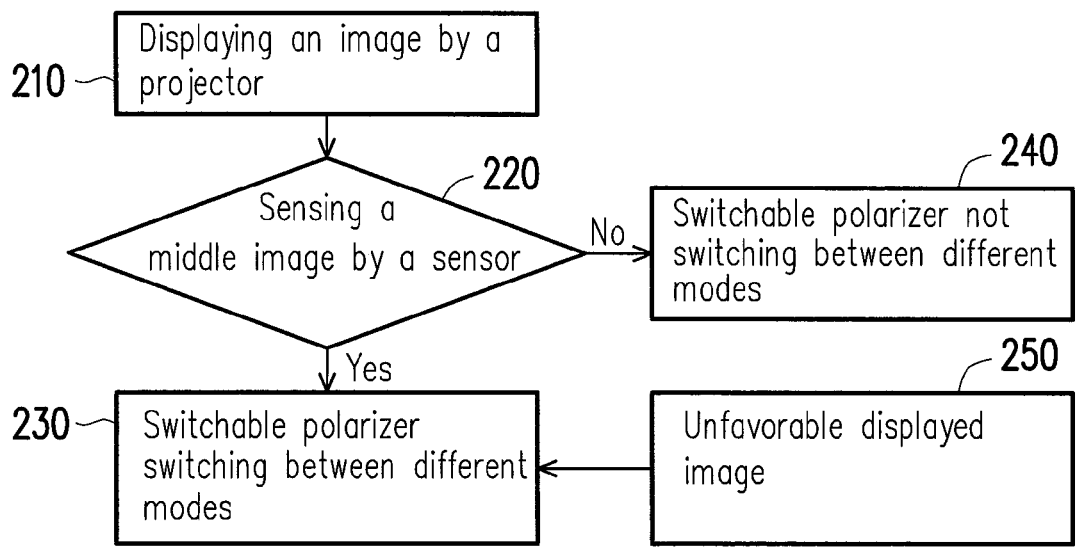
FIG. 4 is a schematic view illustrating a driving method of a display device according to an embodiment of the invention.

FIG. 4 is a schematic view illustrating a driving method of a display device according to an embodiment of the invention. With reference to FIG. 1 and FIG. 4, the driving method described herein is applied to the display device depicted in FIG. 1, for instance. In step S210, an image is displayed by the projector 110. After passing the switchable polarizer 130, the light of the image may be projected onto the projection screen 120 and may be reflected by the projection screen 120, so that the sensor 140 and a user may receive the reflected image light. In a stereo display mode, the images displayed by the projector 110 include the first image, the second image, and the first and second middle images interposed between the first image and the second image. Here, the first and second middle images may vary according to the factory default of the projector 110. In an embodiment of the invention, each of the first middle image and the second middle image may be a gray-scale image, a full-white image, a full-black image, or any other default image. Besides, the first image and the second image are predetermined to be rendered to different eyes.

When the projector 110 displays an image, the sensor 140 continuously senses the image displayed on the projection screen 120. Once the sensor 140 senses the first middle image or the second middle image in step S220, the control circuit 160 outputs a synchronous signal to the switchable polarizer 130, such that the switchable polarizer 130 may switch between different modes in step S230. If the sensor 140 does not sense the first middle image or the second middle image (or the image sensed by the sensor 140 is neither the first middle image nor the second middle image), the control circuit 160 does not send any signal to the switchable polarizer 130 (step S240). In other words, if the image sensed by the sensor 140 is the first image or the second image, the switchable polarizer 130 does not switch between different modes.

When the switchable polarizer 130 is in the first mode, the image may pass the first lens 152 but not the second lens 154 of the pair of polarization glasses 150. Thus, in the first mode, the image is merely rendered to the left eye of the user. By contrast, when the switchable polarizer 130 is in the second mode, the image may pass the second lens 154 but not the first lens 152 of the pair of polarization glasses 154. Thus, in the second mode, the image is merely rendered to the right eye of the user. As the first image and the second image are respectively rendered to the left eye and the right eye, the switchable polarizer 130 is required to stay in the first mode when the first image is displayed, and the switchable polarizer 130 is required to stay in the second mode when the second image is displayed. Otherwise, the right-eye image may be rendered to the left eye of the user, and the left-eye image may be rendered to the right eye of the user, which leads to unfavorable quality of the displayed image.

If the first middle image is identical to the second middle image, the switchable polarizer 130 can only switch between different modes, which may result in failing to switch to a predetermined mode corresponding to the displayed images. This may also bring about unfavorable quality of the displayed image. Hence, the user may decide whether to further switch the mode of the switchable polarizer 130 according to the image observed by himself or herself. For instance, in step S250, if the user is aware of the unfavorable quality of the displayed image, the user may manually control the switchable polarizer 130 to switch between different modes.

Certainly, the driving method described in the previous embodiment should not be construed as a limitation to the scope of the invention. In another embodiment of the invention, the first and second middle images may be different from each other, and the images sequentially displayed by the projector 110 may be the first image, the first middle image, the second image, and the second middle image. When the sensor 140 senses the first middle image, the control circuit 160 may control the switchable polarizer 130 to switch from the first mode to the second mode; when the sensor 140 senses the second middle image, the control circuit 160 may control the switchable polarizer 130 to switch from the second mode to the first mode. Thereby, the polarization state of the light of the displayed image may correspond to the contents of the displayed image. In this case, the issue of unfavorable quality of the displayed image does not occur, and the user is not required to manually control the switchable polarizer 130 to switch between different modes.

Figure 5:
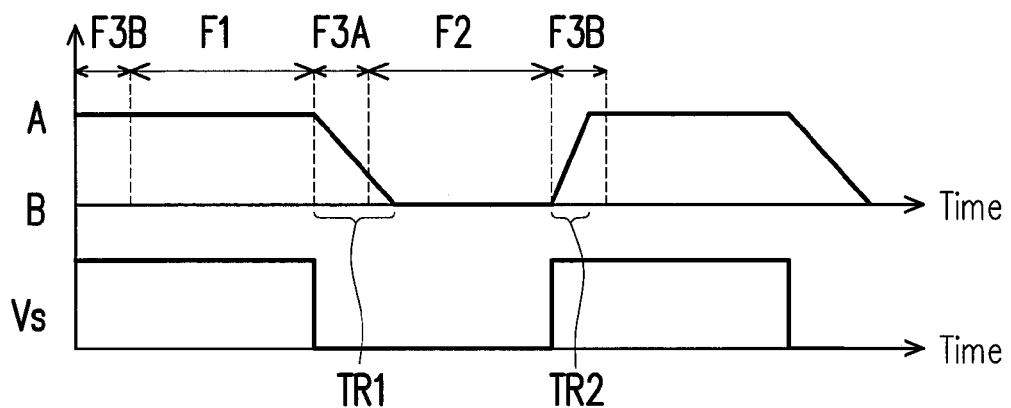
FIG. 5 is a schematic view illustrating driving timing of a display device according to an embodiment of the invention.

Particularly, the driving timing of the display device 100 is shown in FIG. 5. In FIG. 5, the horizontal axis stands for timing. It can be observed from FIG. 5 that the first image F1, the first middle image F3A, the second image F2, and the second middle image F3B are sequentially displayed. With reference to FIG. 1 and FIG. 5, the synchronous signal Vs is the signal output by the control circuit 160 to the switchable polarizer 130, and the first mode A and the second mode B are the two modes of the switchable polarizer 130.

According to the present embodiment, when the sensor 140 senses the first middle image F3A or the second middle image F3B, the control circuit 160 outputs the synchronous signal Vs. Hence, as long as the first middle image F3A or the second middle image F3B is sensed, the synchronous signal Vs is correspondingly changed or switched. After the synchronous signal Vs output by the control circuit 160 is input to the switchable polarizer 130, the switchable polarizer 130 is driven to be correspondingly switched to the first mode A or the second mode B.

When the switchable polarizer 130 switches between different modes through the optical function of a liquid crystal layer, the synchronous signal Vs can include two states of a first voltage and a second voltage for driving the liquid crystal layer. When the synchronous signal Vs states in the first voltage, the switchable polarizer 130 is in the first mode A, for instance; when the synchronous signal Vs states in the second voltage, the switchable polarizer 130 is in the first mode B, for instance. As shown in FIG. 5, a response time TR1 is required for switching the switchable polarizer 130 from the first mode A to the second mode B, and a response time TR2 is required for switching the switchable polarizer 130 from the second mode B to the first mode A. When the switchable polarizer 130 has the structure shown in FIG. 2 or FIG. 3, the response time TR1 may be greater than the reaction TR2, for instance; however, the invention is not limited thereto. The response time TR1 and the response time TR2 may be determined according to the liquid crystal properties of the liquid crystal layer and may be identical to or different from each other.

The longer the response time TR1 and the response time TR2 are, the easier the cross-talk issue occurs in the displayed stereo image. In the present embodiment, the start time of the synchronous signal Vs is substantially the same as the start time of the first middle image F3A or the start time of the second middle image F3B, and therefore the response time TR1 and the response time TR2 are overlapped with the time period during which the middle image F3A or the middle image F3B is displayed. Thereby, the switching period of the switchable polarizer 130 switching between different modes is within the time period during which the middle image F3A or the middle image F3B is displayed, and the cross-talk issue is rather unlikely to occur.

From another perspective, in the present embodiment, the switching speed of the liquid crystal layer may be raised by driving the switchable polarizer 130 in an over-drive manner. That is, the voltage value of the synchronous signal Vs corresponding to the first mode A may selectively exceed the voltage required for driving the liquid crystal layer, such that the response time TR2 required by the switchable polarizer 130 for switching from the second mode B to the first mode A may be reduced. In an embodiment of the invention, the time period during which the first middle image F3A or the second middle image F3B is displayed may be 2 mini second (ms), which should however not be construed as a limitation to the invention. If the response time TR1 and the response time TR2 are shorter than the time period (2 ms) during which the first middle image F3A or the second middle image F3B is displayed, the switchable polarizer 130 stays in the first mode A within the time period during which the first image F1 is displayed, and the switchable polarizer 130 stays in the second mode B within the time period during which the second image F2 is displayed. Thereby, the cross-talk issue may be effectively resolved.

In view of the foregoing, a user may observe the stereo image as long as the user wears a pair of polarization glasses with polarization lenses. In comparison with the conventional shutter glasses, the polarization glasses are rather light and handy; hence, the display device described in an embodiment of the invention brings comfort to the user. After observing the stereo image for a long time, the user is not apt to be bothered by the weight of the glasses. Moreover, the display device described in an embodiment of the invention merely requires one projector for displaying stereo images, thus simplifying the overall design of the display device.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A display device for a user seeing an image displayed by the display device through a pair of polarization glasses to obtain a stereo image, the display device comprising:
    a projector sequentially displaying a first image, a first middle image, a second image, and a second middle image on a projection screen;
    a switchable polarizer located between the projection screen and the projector, the switchable polarizer being switchable between a first mode and a second mode, such that each of a light of the first image and another light of the second image has a first polarization state or a second polarization state after passing through the switchable polarizer in the first mode or the second mode and is projected onto the projection screen; and
    a sensor coupled to the switchable polarizer, the sensor sensing the images on the projection screen, wherein when the sensor senses the first middle image or the second middle image, the switchable polarizer switches from one of the first mode and the second mode to the other.

2. The display device as recited in claim 1, wherein the switchable polarizer comprises a liquid crystal unit and a polarization plate, and the polarization plate is located between the projector and the liquid crystal unit.

3. The display device as recited in claim 2, wherein the switchable polarizer further comprises a quarter wave plate located between the polarization plate and the projection screen.

4. The display device as recited in claim 3, wherein the quarter wave plate is located between the liquid crystal unit and the projection screen.

5. The display device as recited in claim 3, wherein the quarter wave plate is located between the liquid crystal unit and the polarization plate.

6. The display device as recited in claim 2, further comprising a control unit coupled to the sensor and the switchable polarizer, wherein when the sensor senses the first middle image or the second middle image, the control unit drives the liquid crystal unit, such that the switchable polarizer switches from one of the first mode and the second mode to the other.

7. The display device as recited in claim 1, wherein the projection screen is a screen capable of reflecting light without a depolarization.

8. The display device as recited in claim 1, wherein a first lens of the pair of polarization glasses has a transmission axis allowing a light having the first polarization state to pass through and a second lens of the pair of polarization glasses has another transmission axis allowing a light having the second polarization state to pass through.

9. The display device as recited in claim 1, wherein the projector is a digital light processing projector.

10. The display device as recited in claim 1, wherein the first middle image and the second middle image are identical.

11. The display device as recited in claim 1, wherein the first middle image is different from the second middle image, the switchable polarizer switches from the first mode to the second mode when the sensor senses the first middle image, and the switchable polarizer switches from the second mode to the first mode when the sensor senses the second middle image.

12. A driving method of a display device, comprising:
providing the display device comprising:
a projection screen;
a projector sequentially displaying a first image, a first middle image, a second image, and a second middle image on the projection screen;
a switchable polarizer located between the projection screen and the projector, the switchable polarizer being switchable between a first mode and a second mode; and
a sensor coupled to the switchable polarizer, the sensor sensing the images on the projection screen; and
when the sensor senses the first middle image or the second middle image, switching the switchable polarizer from one of the first mode and the second mode to the other, such that each of a light of the first image and another light of the second image has a first polarization state or a second polarization state after passing through the switchable polarizer in the first mode or the second mode and is projected onto the projection screen.

13. The driving method of the display device as recited in claim 12, wherein the display device further comprises a control circuit coupled to the sensor and the switchable polarizer.

14. The driving method of the display device as recited in claim 13, wherein when the control circuit receives a signal indicating that the sensor senses the first middle image or the second middle image sensed, the control circuit outputs a synchronous signal to the switchable polarizer.

15. The driving method of the display device as recited in claim 14, wherein the synchronous signal comprises a first voltage and a second voltage, and the first voltage and the second voltage drive the switchable polarizer to be in the first mode and the second mode, respectively.

16. The driving method of the display device as recited in claim 15, wherein when the control circuit receives a signal indicating that the sensor senses the first middle image, the synchronous signal is the first voltage, and when the control circuit receives another signal indicating that the sensor senses the second middle image, the synchronous signal is the second voltage.

17. The driving method of the display device as recited in claim 14, wherein a start time of the synchronous signal is synchronized with a start time of the first middle image or a start time of the second middle image.

* * * * *